United States Patent

Marshall et al.

[11] Patent Number: 5,835,279
[45] Date of Patent: Nov. 10, 1998

[54] BINOCULAR VISION SYSTEM OF A HEAD MOUNTED DISPLAY UNIT

[75] Inventors: Ian Marshall, Hove; Richard Holmes, Nuneaton, both of United Kingdom

[73] Assignee: Virtuality (IP) Limited, Leicester, United Kingdom

[21] Appl. No.: 395,071

[22] Filed: Feb. 27, 1995

[30] Foreign Application Priority Data

Mar. 1, 1994 [GB] United Kingdom .................... 9403925

[51] Int. Cl.⁶ .......................... G02B 25/00; G02B 03/02
[52] U.S. Cl. ............................................ 359/645; 359/716
[58] Field of Search .................................. 359/645, 716, 359/630

[56] References Cited

U.S. PATENT DOCUMENTS 4,679,912  7/1987  Loy .......................................... 359/645
5,162,945  11/1992  Matsuo et al. ............................ 359/645
5,305,147  4/1994  Hasegawa et al. ....................... 359/644

FOREIGN PATENT DOCUMENTS 2 064 159  6/1981  United Kingdom .

Primary Examiner—Georgia Y. Epps
Assistant Examiner—Ricky Mack
Attorney, Agent, or Firm—Young & Thompson

[57] ABSTRACT

An optical system comprising three lenses concentrically housed in a frame is aligned with a screen on which a televisual image of a virtual reality application is displayed. The compact and high power lenses permit the eye of a viewer when placed at eye position to have a wide field of view of the magnified virtual image of the screen. To train the eye of the user along the optical axis of the system the lenses vignette the image on the screen when the eye is not closely aligned with the axis. By plastics moulding one or more of the lenses so that they are of truncated form it is possible for injection points of the mould to be adjacent truncated side faces thereby permitting a balanced generally free flow of material through the mould cavity which results in minimal optical stresses in the finished lens.

18 Claims, 4 Drawing Sheets

BINOCULAR VISION SYSTEM OF A HEAD MOUNTED DISPLAY UNIT

BACKGROUND OF THE INVENTION

This invention relates to optical systems generally and particularly, although not exclusively, to an optical system for use in pairs within a binocular vision system of a head mounted display used in immersive virtual reality or televisual applications.

DESCRIPTION OF THE RELATED ART

Typically, in virtual reality applications a head mounted display somewhat akin to a helmet houses, disposed forwardly of the eyes, a pair of LCD video display screens viewed through a pair of magnifying optical systems or eyepieces which collimate two images to provide a binocular virtual image. As is well known in the field of lens design optical aberrations become ever more complex when light follows paths through a system of lenses remote from the optical axis. Consequently, the aberrations generally known by the names coma, astigmatism and distortion have to be partially or completely compensated. Some compensation of non-infinite projected conjugate can be left to the observer's eye.

The recent availability of miniature LCD video displays currently is leading to the design of smaller visor like head mounted displays. This necessitates that the optical systems used provide for increased magnification relative to what has previously been required when using larger LCD displays. It will be appreciated that this exacerbates the problems associated with the aberration of light paths remote from the optical axis. Conventionally, to minimise the effect of aberrations it has been the practice to use only a restricted field of view, typically in the order of 40 degrees wide, thereby avoiding light paths remote of the optical axis.

It is desirable that the images projected from two eyepieces can be angled away from each other, so as to increase the perceived field of view with partial binocular overlap. Additionally, and particularly when partial binocular overlap occurs, it is known and of some concern that any inaccuracy of the projected images can cause eyestrain or other psychovisual disturbances. To avoid such problems, it is a requirement for eyepieces that the aberration known as distortion is accurately compensated by the lens design. Alternatively, computer correction of optical distortion may be used. However, the conditioning of images in real time systems is extremely expensive in hardware requirements.

Distortion is here defined as deviations of rays that pass through the centre of the nominal exit pupil (principal rays) from a perfect optical mapping function. The term 'nominal exit pupil' herein refers to a virtual aperture, defined in the mathematics of lens design but not a real optical effect, which is positioned at or near the centre of rotation of the observer's eyeball. Light paths can be mathematically generated from this 'nominal exit pupil' so as to illustrate the way the user's eye interacts with a projected image. A perfect optical mapping function is normally defined as the condition arising when the above mentioned principal rays subtend an angle 'theta' to the optical axis at the nominal exit pupil, and intersect an LCD image plane at a height 'Yb' according to the relationship:

$$Yb = EFL \times \tan(\text{theta})$$

(Where EFL is the focal length of the eyepiece)

SUMMARY OF THE INVENTION

It is an object of the invention to provide an optical system or eyepiece suitable for use in visor-like head mounted displays which provides for a wider field of view than has hitherto generally been practicable, with improved compensation of distortion, of lighter weight and a cheaper construction.

According to a first aspect of the invention, an optical system, for use in a binocular vision system of a head mounted display used in immersive virtual reality or televisual applications, consists of three lenses fixed relative to one another by mounting means so as to be coaxially aligned along an optical axis extending between an eye position and a generally flat screen on which a video image is displayed, wherein the lenses comprise at least two aspheric surfaces with the geometry and material composition of the lenses being designed to provide that light passing therethrough from the screen is subject to compensation of higher order astigmatism and distortion aberrations which result from the interaction of the said aspheric surfaces and with said compensation producing relatively small residual zonal astigmatism and distortion aberrations. Preferably, the geometry and material composition of the lenses provides for telecentricity and partial compensation of both lateral chromatic and Petzval curvature aberrations.

Typically, the video image is of oblong shape and optically aligned with at least one of the lenses, said lens having a truncated circular end plan profile (ie: said truncation of the lens having effectively removed material in what would be an operatively and optically redundant portion of the lens were the lens of typical circular plan profile). In which case the truncated lens may be fabricated from optical grade plastics injection moulding using a method in which the truncated form of the said lens provides during the moulding thereof that gates permitting ingress and egress of moulten material are located at the truncated edge surfaces of the resulting lens thereby facilitating rapid feed of material so as to minimise turbulence as it flows through the mould to give consequently better optical clarity in the body of the lens by minimising optical stresses therein.

Conveniently, the arrangement provides in use with an eye of a user at the said eye position that the dimensions of the lenses result in vignetting of the virtual image of the screen unless the eye's axis is aligned or closely aligned with the said optical axis thereby facilitating training of the eye along the said optical axis so as in virtual reality applications to encourage movement of the head rather than the eye to change the field or direction of view.

The first and third lenses may be converging aspheric lenses and the second lens may be an all-spherical diverging lens. Preferably, the first and third lenses are fabricated by injection moulding from acrylic material and the second lenses is similarly fabricated from polystyrene or polycarbonate material. Vignetting of the virtual image may be facilitated by truncating the upper and lower extent of all of the lenses. Typically, the second lens has a diverging focal length between 20 to 50 mm and the first and third lenses have focal lengths between 15 to 35 mn measured at small apertures where coefficients are of little consequence.

Preferably, the screen is a miniature LCD video display displaced no more than 60 mm from the eye point, more preferably less than 54 mm from the eye point. Ideally, the system provides in use a field of view at least 71 degrees diagonal. The eye relief, ie: the distance from the pole of the said third lens and the centre of rotation of the eyeball, may be at least 17 mm.

Suitably, the mounting means provides that the lenses are air-spaced so as to be either spaced apart or respectively in contact with one another. Alternatively, the second of said lenses is cemented to the first and/or third of said lenses. The combined weight of the three said lenses may be no more than 85 grammes, preferably less than 30 grammes. Conveniently, the mounting means comprises a plastics moulded frame in which the lenses are clipped into place.

According to further aspect of the invention, a head mounted display, for use in immersive virtual reality, comprises a binocular vision system consisting of a pair of optical systems each in accordance with the aforedescribed first aspect of the invention and adjustment means permitting independent focusing and interocular adjustment of the optical systems.

Ideally, a field of view of typically 60 degrees wide (ie: 71.6 degrees diagonal with a 4:3 aspect ratio) projected from a 26.92 mm by 20.19 mm image is required. To meet this requirement each eyepiece would have a focal length in the order of 23.3 mn. Each eyepiece is designed as a magnifier with diffuse illumination from the respective LCD screen illuminating the majority of the lens aperture. For reasons of simplicity the invention provides that aberrations are only corrected well over the nominal exit pupil that is close to the centre of rotation of the eye. The observer is induced to place his eye at a position generally aligned with the optical axis of the eyepiece for correct adjustment because only at that position is it possible to see the corners of the LCD screen. Typically, the exit pupil diameter is 7 mm.

To provide the aforementioned field of view and requisite degree of magnification, conventional design methodology would suggest lens designs that are both too heavy and costly for the proposed use. An example of such a lens design would be a 5 element 'Erfle eyepiece' construction incorporating only spherical refracting surfaces. Such a design is capable of providing a 60 degree field of view only at the expense of exhibiting large distortion errors rendering it unsuitable for use in a head mounted device.

BRIEF DESCRIPTION OF THE DRAWINGS

A preferred embodiment of the invention will now be described, by way of example only, with reference to the accompanying drawings, in which.

DETAILED DESCRIPTION OF THE PREFERRED EMBODIMENTS

Figure 1:
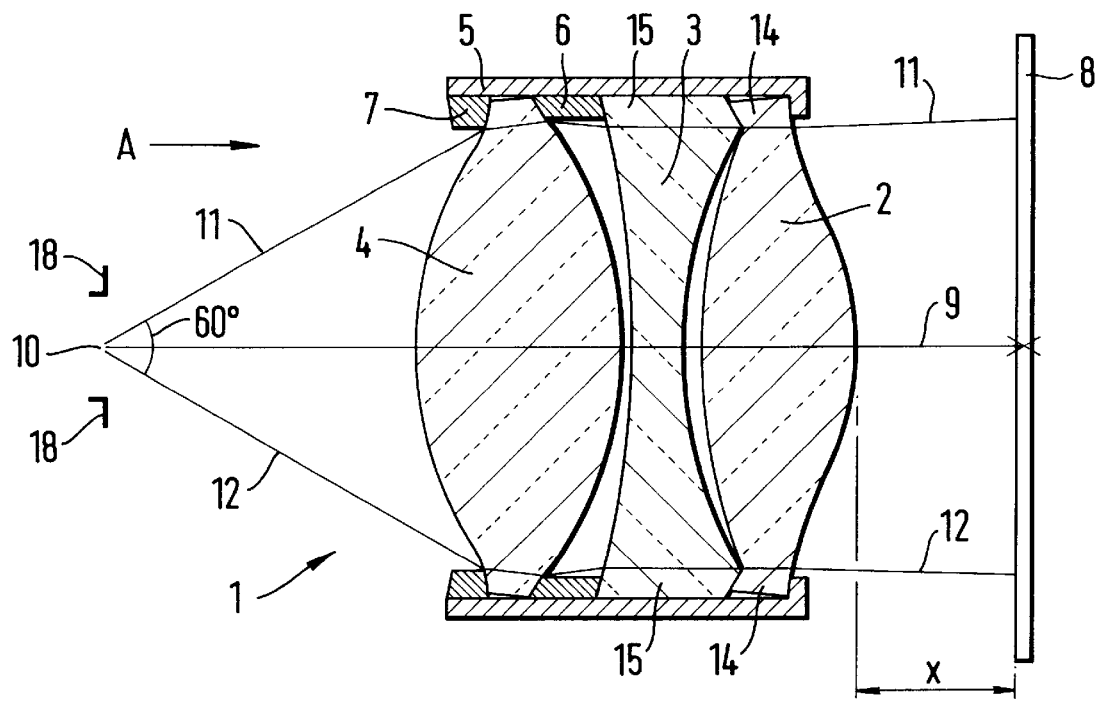
FIG. 1 is a diagrammatic horizontal section through an optical system or eyepiece in accordance with the invention.

An optical system or eyepiece 1 comprises an array of three lenses 2,3,4 fixed relative to one another by mounting means having a framework 5, an annular spacer element 6 and an annular end clip 7. The system 1 further comprises a wafer thin flat LCD video display screen 8 attached to the framework 5 by adjustable fixing means (not shown) at a distance 'x' from lens 2 so as to be movable over a range of typically 3.2 mm. The aforementioned adjustment is desirable to enable different users to focus the eyepiece 1 to suit themselves.

The lenses 2,3,4 are mounted coaxially and concentrically along an optical axis 9 extending perpendicularly from the centre of the screen 8 and through and eye position 10. An eye placed at the eye position 10, typically less than 56 mm from the screen 8, and trained along the optical axis 9, has a 60 degree field of view in the horizontal plane (46.8 degrees in the vertical plane and 71.6 degrees diagonally) of the 26.92 mm times 20.19 mm image provided by LCD screen 8 as shown by the ray traces 11 and 12. Desirably, with the eye at position 10 the eye relief is 17 mm (ie: the distance between the eye's centre of rotation and the pole of lens 4 is 17 mm).

Figure 2:
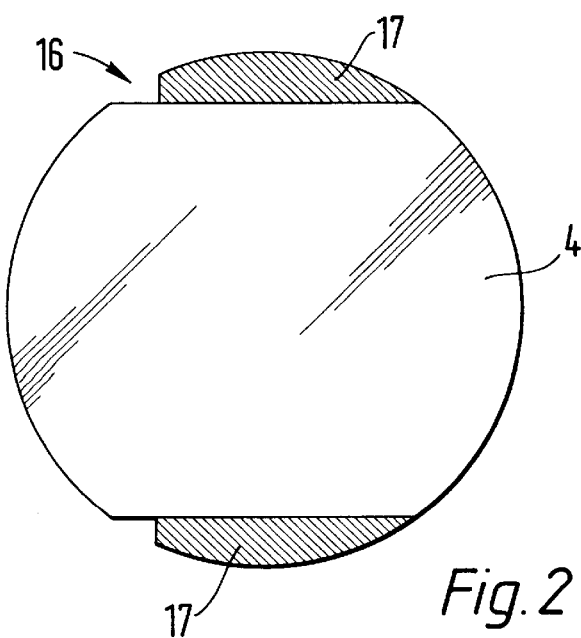
FIG. 2 is an end plan view of one lens of the system or eyepiece as seen in the direction A in FIG. 1.

A first of the lenses, lens 2 is a converging aspheric lens fabricated from acrylic material having peripheral formations 14 adapted to seat in framework 5 and to provide an abutment for similar formations 15 of diverging all-spherical lens 3, a second of said lenses fabricated from polycarbonate or polystyrene material. The spacer element 6 spaces and abuts both the second lens 3 and the third lens 4 which is similarly to lens 2 a converging aspheric acrylic lens. The three lenses are held in position by the end clip 7 which engages the framework 5 and abuts the third lens 4. To vent air spaces the lenses are provided with peripheral cut away portions similar to slot 16 of lens 4 shown in FIG. 2. Portions of the lenses similar to shaded portions 17 of lens 4 are those which during moulding are near to apertures in the moulds through which molten material is extruded and/or air is vented. In such regions lens material tends to suffer from stress birefringence and surface deformations. Hence, these portions of the lens may suitably be obscured by the framework 5 so as in effect to truncate the operational extent of the lenses.

Figure 5:
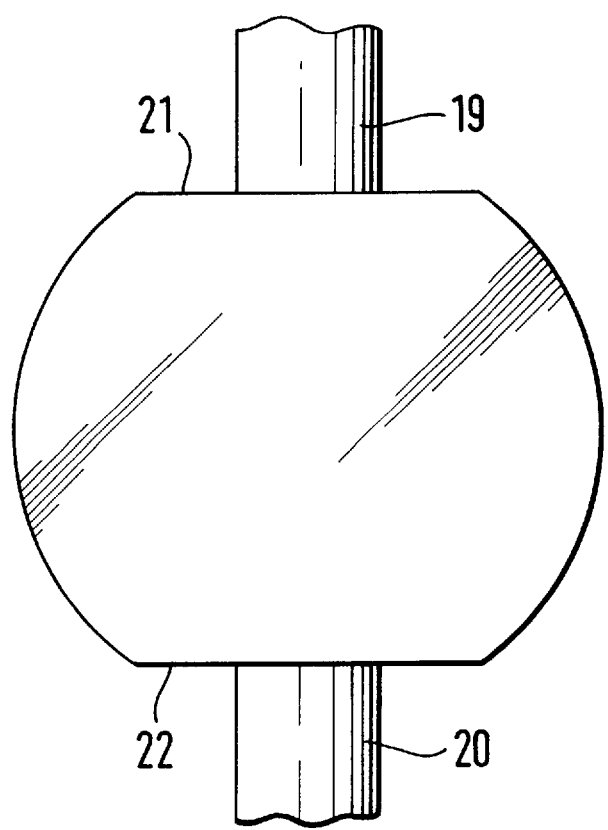
FIG. 5 is an end plan view of a lens for the system or eyepiece freshly released from a mould tool.

Suitably, one or more of the lenses 2,3,4 may be of the form shown generally in FIG. 5 which illustrates a lens as it would appear direct from a mould tool complete with cylindrical sprues 19,20 of typically 8m diameter. It will be apparent that these sprues 19,20 are removed to provide a truncated lens similar to that illustrated in FIG. 2 but absent the shaded portions 17. A double truncated lens such as that shown in FIG. 5 has flats 21,22 which can facilitate location in a suitable frame 5.

Sprue 19 represents material being fed into the mould cavity whilst sacrificial sprue 20 results from material exiting the cavity. This sacrificial sprue 20 is important as it provides a balanced mould tool which avoids differential shrinkage thereby reducing to a minimum optical stresses in the resulting lens. Any stresses will be found closely adjacent the flats 21,22 which are of little importance because they lie in optically redundant regions of the lens.

A lens as illustrated in FIG. 5 can be manufactured to micron tolerances. Lenses of the high power and compact size required for the aforedescribed application would hitherto have required manufacture using high speed diamond turning techniques to achieve the desired tolerances. Conventional, plastics moulding techniques using injection points around the edge periphery of a circular lens would result in poor flow characteristics through the mould tool producing great optical stresses in any resulting lens of the dimensions required.

The diameters of the lenses 2,3,4 are chosen so that the observer must train his eye along the optical axis 9 to prevent vignetting, ie: fading or truncating of the image shown on the screen 8, in the corners of the picture. This is to limit the range of eye misalignment relative to the eyepiece for a properly adjusted helmet or visor on which the eyepiece is mounted.

It will be appreciated that although in this embodiment the lenses 2,3,4 are spaced apart from one another, in other embodiments of the invention they may be touching or even glued together with a thin laminate of glue being disposed therebetween. However, in large scale production there are benefits in avoiding the added costs of adhesion. Also, the second lens 3 instead of being all-spherical may be aspheric. The current design allows for a lightweight construction with the lenses 2,3,4 having a combined weight in the order of 19 grammes.

The lenses 2,3,4 are constructed, suitably by plastics moulding, to have the following specifications, in which 'surface 1' is deemed to be the lens surface of an eye at the nominal exit pupil (bordered by markings 18) at eye position 10, refractive surfaces are numbered consecutively therefrom in order of increased spacing from the eye position 10 (ie: lens 4 has surfaces 2,3; lens 3 has surfaces 4,5 and lens 2 has surfaces 6,7) and surfaces 8,9 represent the planar cover glass over the LCD screen 8:(i)

(i)The surface shapes

| SURFACE NUMBER | VERTEX RADIUS | ASPHERIC COEFFICIENTS | | | |
|---|---|---|---|---|---|
| | | A4 | A6 | A8 | A10 |
| 1 | 3.5000 (nominal exit pupil) | infinity | all | zero | |
| 2 | 18.039 | −3.9654 e-5 | 2.04536 e-7 | −7.64518 e-10 | 9.72685 e-13 |
| | (convex aspheric parabola, conic constant = −1) | | | | |
| 3 | −24.5625 | | | | |
| | (convex sphere, conic constant = 0) | | | | |
| 4. | −58.6633 | | | | |
| | (concave sphere, conic constant = 0) | | | | |
| 5 | 27.6167 | | | | |
| | (concave sphere, conic constant = 0) | | | | |
| 6 | 39.7303 | | | | |
| | (convex sphere, conic constant − 0) | | | | |
| 7 | −15.7603 | 8.73131 e-5 | 2.25467 e-7 | −1.39884 e-9 | 5.92222 e-12 |
| | (convex asphere, conic constant = 0) | | | | |
| 9 | planar | | | | |
| 10 | planar | | | | |

The radius of curvature, conic constant and aspheric coefficients are used to generate the surface profile according to the following formulae:

$$X = [cv.p(2)]/[1+\{cc+1\}.cv(2).p(2)](1/2) + A4.p(4) + A6.p(6) + A8.p(8) + A10.p(10)$$

where the coordinate origin is at the pole of the lens surface, ie: on the optical axis;

X is the longitudinal linear coordinate of the surface parallel to the optical axis;

'cv' is 1/radius, and is positive or negative according to its direction;

'cc' is the conic constant of the surface;

If Y and Z are the two other linear coordinates that are orthogonal to X, then 'p' is the square root of $[Y(2)+Z(2)]$; and A4,A6,A8 and A10 are the aforementioned aspheric coefficients.

(ii) clear apertures, separations and materials

| SURFACE NUMBER | CLEAR APERTURE RADIUS | FOLLOWING SEPARATION TO THE POLE OF THE NEXT SURFACE | FOLLOWING MATERIAL |
|---|---|---|---|
| 1 (nominal exit pupil) | 10 | 17 | air (n = 1) |
| 2 | 14.5 | 13.0493 | acrylic (n = 1.493566) |
| 3 | 15.0 | 0.5 | air |
| 4 | 15.0 | 3 | polystyrene (n − 1.594525) |
| 5 | 14.5 | 1.37234 | air |
| 6 | 14.5 | 9.48924 | acrylic |
| 7 | 15.0 | 10.068 | air |
| 8 | 17.0 | 1 | schott glass K5, n = 1.524365 |
| 9 | 17.0 | 0 | air |

Note:
the refractive indices are quoted at 587.6 nanometers wavelength.

The form of aberrations in any lens design can best be understood by away analysing the geometrical properties of rays traced progressively further ay from the optical axis in both field and aperture. In this instance rays traced from the nominal exit pupil to the LCD image plane will be considered. The forms of monochromatic aberrations are limited to a few 'third order' geometries, such that the deviation of the transverse intersection of any ray from its ideal intersection with the LCD image plane is dependent on combinations of multiples of the field coordinate and aperture coordinate from which it is traced, ie:

aperture(3), aperture(2).field, aperture. field(2), field(3)

The actual dependencies have other mathematical relationships to the aperture and field, but the general principle is assumed here that 'third order' defines aberrations that have a combination of field and/or aperture multiplied together three times; 'fifth order'—five time; 'seventh order'—seven times; etc. The dependency of what are called wavefront aberrations and longitudinal aberrations is closely linked to transverse aberrations. However, for reasons of clarity they are not defined or used herein.

The 'third order' aberrations dominate the lens characteristics at small combinations of aperture and field, 'fifth order' dominate at larger combinations of aperture and field, 'seventh order' dominate at larger still combinations, and so forth. The monochromatic properties of the lens design are therefore described herein starting with the 'first order' properties which determine the basic properties of magnification and eye relief (with sane contributions to chromatic aberration and the third order aberration of Petzval Field Curvature), thereafter 'third order' aberrations are described, and subsequently 'higher order' aberrations which is deemed to encompass those of higher than third order.

It is well know that the differing types of 3rd order aberrations are linked to each other in any lens construction, so that with a conventional 3 lens design comprising spherical refractive surfaces, the field of view is limited to well below 60 degrees width, ie: in the order of 40 degrees, if all the relevant 3rd order aberrations are to be nearly compensated. In this invention, the aspheric surfaces are used to compensate the 3rd order aberrations more than the partial compensation provided for by the aforementioned conventional design, so that an increased field of view is provided, ie: in the order of 60 degrees.

The dimensions and materials of the lenses 2,3,4 as aforedescribed have been chosen to facilitate compensation of aberrations which is best understood by considering the resulting optical effects in the following three categories:

(i) First Order Characteristics

The choice of using three lenses has been taken to achieve the necessary magnification at m cost, but also to partially compensate chromatic aberration and meet telecentric requirements detailed hereafter. If one or two elements (lenses) only were used they could not provide the combined compensation of both distortion and chromatic aberration to the same degree of accuracy as the described embodiment of the invention.

The aforedescribed embodiment permits infinity focus when X=10.18 mm; 3 dioptres closer than infinity when x=11.7 mm; and 3 dioptres beyond infinity when x>11.7 mm whilst telecentricity of the image on screen 8 is maintained, ie: the principal rays intersect the LCD image at approximately normal incidence.

The term 'eccentricity' refers to the ratio of two ray heights on any lens surface, namely Eccentricity, E=Yb/Y where:

a) Yb is defined as the principal ray height at full field where the principal ray goes through the centre of the nominal exit pupil at eye position 10; and b) Y is defined as the marginal ray height which intersects the exit pupil at the full aperture for the on-axis field position.

Having determined the optical power by the field of view and LCD size, and the eccentricity of the design generally by the eye relief, the compensation of chromatic aberration becomes necessary. Differing dispersive materials, suitably Acrylic and Polystyrene, are used with opposing powers where the total power must be the reciprocal of the focal length. In the aforedescribed design the individual lens powers are large, whereas in conventional designs this would result in total internal reflection in the middle or last lens of a 3 lens array. This design has been developed with shapes and powers adopted to avoid large angle incidence on the lens surfaces, despite the individual lens powers being large enough to have good correction of lateral colour. This results in the diverging polystyrene lens being between two converging acrylic lenses. The slight spacing between the diverging and converging lenses enables the partial compensation of Petzval Field Curvature. The lens powers and spacing are also chosen to achieve telecentricity in conjunction with the eye relief.

(ii) Third Order Aberrations

The compensation of the third order aberrations is complicated by the use of aspheric surfaces, so that conventional knowledge provides no clear strategy for their compensation. These aberrations are summarised below as contributions from each lens (the eccentricity of each lens varies between the surfaces, so the values given are only approximate).

The following summary of the third order aberrations is based on the approximations involved in calculating the Seidel Aberrations which are well known in the art. These approximate calculations serve to illustrate the trends in aberration compensation occurring in rays traversing the lens design near to the optical axis, and hence the lowest orders of aberrations.

In the following table, the eccentricity is approximately averaged between the two surfaces of the lenses, and the aberrations occurring at each lens surface are summed to give the overall contribution of that lens.

| Lens Approx | Spherical abn | Coma | Astigmatism | Distortion |
|---|---|---|---|---|
| E | S1 | S2 | S3 | S5 |
| 4 −11.87 | −0.0086679 | 0.0361231 | 0.0334659 | −0.549723 |
| 3 −6.84 | 0.0096614 | −0.0088517 | −0.0657193 | −0.9564417 |
| 2 −5.87 | 0.0116474 | −0.0443816 | 0.0575714 | 1.8070967 |

The abovewritten figures are expressed as Seidel Coefficients (ie: proportional to wavefront aberrations) in millimeters. They serve to illustrate that the design is compensating for third order aberrations but not completely. Also, Petzval curvature (S4) is less well compensated with a summed value for the whole lens design of −0.2624565.

(iii) Higher Order Aberrations

Certain kinds of higher order aberrations are dependent on the field of view (fov) as follows:

3rd order coma is proportional to fov
5th order coma is proportional to fov(3)
7th order coma is proportional to fov(5)
9th order coma is proportional to fov(7)
3rd order astigmatism is proportional to fov(2)
5th order astigmatism is proportional to fov(4)
7th order astigmatism is proportional to fov(6)
9th order astigmatism is proportional to fov(8)
3rd order distortion is proportional to fov(3)
5th order distortion is proportional to fov(5)
7th order distortion is proportional to fov(7)
9th order distortion is proportional to fov(9)

Additionally, the aspheric surfaces are so designed as to permit the partial compensation of lower order aberrations by higher order ones up to the ninth order, S9 so that a significant increase of field of vision can be achieved than has hitherto been the case with conventional three lens designs by allowing the introduction of zonal aberrations. These zonal aberrations occur where, for example, the 3rd order aberration is not fully compensated but becomes large at a relatively small field of view. The 5th order aberration of the same type is then of opposing sign to compensate the 3rd order, but does not have the exact relationship with the field of view as the 3rd order ie: is not coextensive thereto, so that the inner portions of the field of view are not fully compensated. The 7th order aberration of the same type is introduced to compensate the 5th order, and the 9th order to compensate the 7th, but at progressively wider fields of view. The result is generally shown in the graphs of astigmatism and distortion in FIG. 3, where with increasing field of view each successive order causes the slope of the aberration with respect to the field of view coordinate to reverse until the next higher order starts to dominate. Hence, the field of view exhibits zones of good and poor aberration compensation, where the poor performance is still more than adequate to meet operational requirements.

Figure 4:
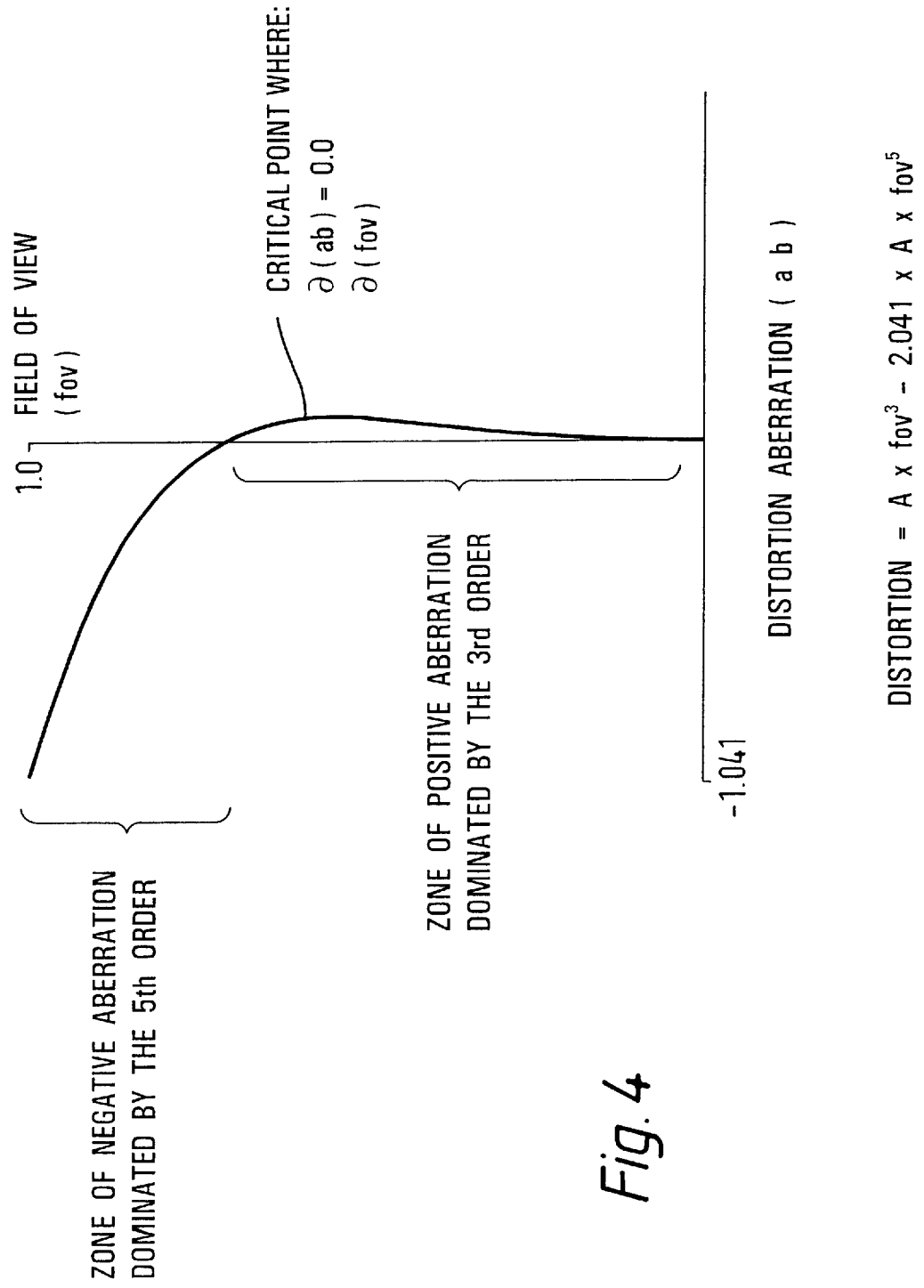
FIG. 4 is a graphical representation of theoretically possible zonal distortion aberration resulting from the partial compensation of 3 rd order distortion with 5 th order distortion.

For example, distortion is by definition only dependent on the field angle of the principal rays traced. If a residual third order aberration [proportional to field(3)] cannot easily be corrected, 70% of the full field an aspheric surface may be used to add the equal and opposite sign of distortion dependent on field(5), so that the overall compensation is as shown in FIG. 4 and the equation defining distortion becomes:

$$\text{Distortion} = A*\text{field}(3) - 2.041*A*\text{field}(5)$$

(where usually the variable "field" is normalised to vary between 0 and 1)

At smaller field than 0.7, the overall distortion is positive, due to a larger third order aberration, but is correspondingly negative for field greater than 0.7. Therefore, there exists a residual zonal distortion, so called because the two forms of aberrations can only exactly compensate each other at one field position, and must go out of balance for other areas of the field of view that are called zones. The existence of zonal effects therefore evidences the existence of partial compensation of different orders of aberrations. The number of 'Critical Pints' shown on the plot of the aberration curve shown in FIGS. 3 and 4, where the slope of the aberration differentiated against the field of view reverses sign, indicates the number of orders having a significant effect. The first 'critical point' away from the optical axis indicates that the fifth order aberration is starting to dominate, the next point indicates that the seventh order is starting to dominate, and so forth.

Figures 3A, 3B, 3C:
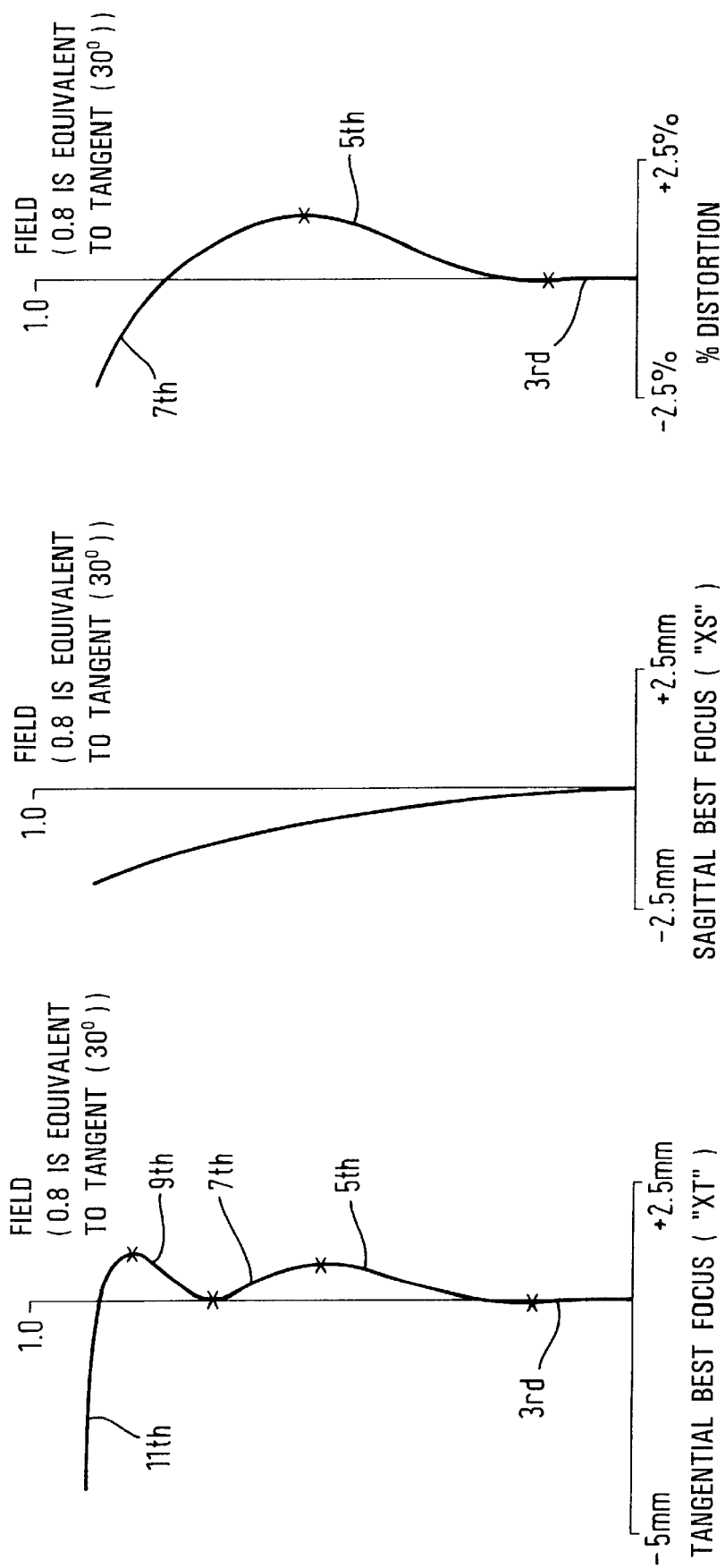
FIG. 3 (a–c) comprises graphical representations of a) Astigmatism, b) Field Curvature and c) Distortion errors respectively of the preferred embodiment.

The zonal effects illustrated in FIG. 3 are calculated by tracing a series of principal rays from differing ray angles at the nominal exit pupil to differing ray heights at the ICD screen, and the results are tabulated as follows:

| RELFY | H | XT | XS | PC DIST | LAT CLR |
|---|---|---|---|---|---|
| 0.90 | −14.734 | −4.054 | −2.031 | −2.222 | 0.1692 |
| 0.80 | −13.365 | 0.871 | −1.551 | −0.226 | 0.1641 |
| 0.70 | −11.806 | −0.004 | −1.189 | 0.729 | 0.1227 |
| 0.60 | −10.179 | 0.507 | −0.878 | 1.324 | 0.0968 |
| 0.50 | −8.480 | 0.764 | −0.655 | 1.296 | 0.0789 |
| 0.40 | −6.751 | 0.501 | −0.490 | 0.792 | 0.0631 |
| 0.30 | −5.035 | 0.125 | −0.335 | 0.231 | 0.0475 |
| 0.20 | −3.347 | −0.046 | −0.178 | −0.048 | 0.0317 |
| 0.10 | −1.674 | −0.033 | −0.050 | −0.046 | 0.0159 |
| 0.00 | 0.000 | 0.000 | 0.000 | 0.000 | 0.0000 |

Where:

RELFY is defined as tan[field angle]/tan[maximum field angle]

H is the ray height from the optical axis at its intersection with the LCD image XT is a measure of defocus for images aligned parallel to the dimension H. XT is calculated as the longitudinal focus shift away from the LCD image plane (normal to the optical axis) in order to get the best focus for rays traced from near to the centre of the nominal exit pupil.

XS is a measure of defocus for images aligned normal to the dimension H. XS is calculated as the longitudinal focus shift away from the LCD image plane (parallel to the optical axis) in order to get the best focus for rays traced from near to the centre of the normal exit pupil.

PC DIST is a measure of distortion being defined by the equation:

[100*$H$/($EFL$*tan {field angle})−100 ie: PC DIST is a percentage distortion error

EFL is the eyepiece focal length

LAT CLR is the difference in ray heights between the blue and red rays at their intersection with the LCD image.

In a similar way to the third order aberrations, the different types of higher order aberrations are related to one another, and to third order ones, so that the overall logic of the aforedescribed design is extremely complex and cannot be derived obviously from the prior art. However, the above-tabulated data clearly reveals zonal effects in the values for XT and distortion which may be summarised as follows:

| RELFY | XT |
|---|---|
| 0.00 | zero due to on-axis focus |
| 0.0–0.2 | small −ve zone, residual 3rd order |
| approx 0.25 | correction of 3rd order with 5th order |
| 0.3–0.6 | large +ve zone, 5th order overcompensation |
| approx 0.7 | correction of 5th order zone with 7th order |
| 0.7–0.8 | large +ve zone caused by 9th order that prevents 7th order zone occurring |
| 0.9–1.0 | very large −ve zone caused by interactions with other forms of lower order aberrations to create 11th order aberrations in a way that offers acceptable resolution in the field corner. |

| RELFY | % DISTORTION |
|---|---|
| 0.0 | zero by definition |
| 0–0.2 | small −ve, residual 3rd order |
| approx .25 | correction of 3rd order with 5th order |
| 0.4–0.7 | large +ve, 5th order zone |
| approx 0.75 | correction of 5th order zone with 7th order |
| 0.8–1.0 | large −ve, 7th order zone |

Offsetting lower order aberrations with higher order ones is a common design technique, but innovation is here apparent by the much greater extent to which the higher order terms introduced by the aspheric surfaces are large and of opposing effect thereby effecting more complex correction and compensation than hitherto has been possible using existing optical techniques. Also, the numbers of orders used, ie: in this correction, are greater than in the state of the art. Hence, the use of aspheric surfaces result in the a lens system or array have greatly improved characteristics over normal aberration.

The partial chromatic aberration revealed by the parameter ILAT CIR in the above-tabulated data is sufficiently tolerable for only consideration of the third order compensation of lateral colour to be important. In developing the design of the aforedescribed optical system or eyepiece 1, it was found that the most sensitive error to manufacturing defects was the tangential best focus denoted XT which is largely dependent on astigmatism. Consequently, it became apparent that XT should be designed to be as close to zero as possible so that the best focus field positions for tangential images be near the same plane for all field positions.

In virtual reality applications the optical system 1 is designed to be used in binocular pairs which are respectively mounted at left and right eye positions on a visor like head mounted display worn by the user. Relative adjustment between the two systems 1 can be provided by means permitting interoccular and/or focus adjustment by the user. The LCD image is typically a colour image and the systems 1 as aforedescribed have been designed to provide a clear generally undistorted stereoscopic image.

The following table is provided to be read in conjunction with FIG. 3 to which it refers:

\* Marks the approximate position of 'critical points'

3rd Marks the zone of total aberration dominated by 3rd order aberrations

5th Marks the zone of total aberration dominated by 5th order aberrations

7th Marks the zone of total aberration dominated by 7th order aberrations

9th Marks the zone of total aberration dominated by 9th order aberrations

11th marks the zone of total aberration dominated by 11th order aberrations

We claim:

1. In a binocular vision system of a head-mounted display unit for use in immersive virtual reality or televisual applications, an optical system comprising:

a substantially flat screen adapted to display a video image, means locating an eyepoint at which a user's eye is located during use of said head-mounted unit, said system having an optical axis extending between said screen and said eyepoint, and a sequence of lenses arranged coaxially along said optical axis, said lenses having a plurality of lens surfaces, at least two of said lens surfaces being of aspherical configuration, said aspherical lens surfaces having respective profiles as a function of eccentricity operative to counteract astigmatism and distortion aberrations of a given order with astigmatism and aberrations of opposing sign and of the next higher order, up to at least the ninth order of said aberrations, whereby a large field of view is produced, and wherein the geometry and material composition of said lenses provides for telecentricity and partial compensation of both lateral, chromatic and Petzval curvature aberrations.

2. A system in accordance with claim 1, in which said field of view is of oblong shape and optically aligned with at least one of the lenses with said lens having a truncated end planar profile.

3. A system in accordance with claim 1, in which first and third of said lenses are acrylic material and the second lens is another plastics material.

4. A system in accordance with claim 1, in which vignetting of the field of view is facilitated by upper and lower extents of all of the lenses being truncated.

5. A system in accordance with claim 1, in which the second lens is a diverging lens having a diverging focal length between 20 and 50 mm.

6. A system in accordance with claim 1, in which first and third said lenses are converging aspheric lenses having focal lengths between 15 and 35 mm as measured at small apertures and the second lens is a diverging lens having a diverging focal length between 20 and 50 mm.

7. A system in accordance with claim 1, in which said screen is a miniature LCD video display.

8. A system in accordance with claim 1, in which said screen is displaced less than 54 mm from said eyepoint.

9. A system in accordance with claim 1, in which said screen is displaced less than 54 mm from said eyepoint.

10. A system in accordance with claim 1, providing in use a field of view at least 71 degrees diagonal.

11. A system in accordance with claim 1, providing in use that the eye relief is at least 17 mm.

12. A system in accordance with claim 1, in which said mounting means provides that said lenses are air-spaced so as to be spaced apart.

13. A system in accordance with claim 1, in which a second of said lenses is cemented to a first and a third of said lenses.

14. A system in accordance with claim 1, in which said three lenses have a combined weight of no more than 85 grams.

15. A system in accordance with claim 1, in which said three lenses have a combined weight less than 30 grams.

16. A system in accordance with claim 1, in which mounting means for said lenses comprises a plastics moulded frame in which said lenses are clipped into place.

17. A head mounted display, for use in immersive virtual reality, comprising a binocular vision system consisting of a pair of optical systems as in claim 1, and adjustment means permitting independent focusing and interocular adjustment of said optical systems.

18. In a binocular vision system of a head-mounted display unit for use in immersive virtual reality or televisual applications, an optical system comprising:

a substantially flat screen adapted to display a video image, means locating an eyepoint at which a user's eye is located during use of said head-mounted unit, said system having an optical axis extending between said screen and said eyepoint, and a sequence of lenses arranged coaxially along said optical axis, said lenses having a plurality of lens surfaces, at least two of said lens surfaces being of aspherical configuration, said aspherical lens surfaces having respective profiles as a function of eccentricity operative to counteract astigmatism and distortion aberrations of a given order with astigmatism and aberrations of opposing sign and of the next higher order, up to at least the ninth order of said aberrations, whereby a large field of view is produced, and wherein the geometry and material composition of said lenses provides for telecentricity and partial compensation of both lateral, chromatic and Petzval curvature aberrations, and wherein said first and third lenses are converging aspheric lenses and said second lens is a diverging lens.

* * * * *